US009562608B2

(12) United States Patent
Kimura et al.

(10) Patent No.: US 9,562,608 B2
(45) Date of Patent: Feb. 7, 2017

(54) ROTARY SHAFT SEAL STRUCTURE FOR DRIVE SYSTEM OF VEHICLE (71) Applicants: AISIN SEIKI KABUSHIKI KAISHA, Kariya-shi (JP); TOYOTA JIDOSHA KABUSHIKI KAISHA, Toyota-shi (JP)

(72) Inventors: Tsuyoshi Kimura, Toyota (JP); Noriaki Nonaka, Chiryu (JP); Yasuaki Tahara, Nagoya (JP); Atsushi Kajikawa, Hekinan (JP); Masaya Michishita, Okazaki (JP); Hirofumi Goto, Toyota (JP); Tadashi Yamada, Toyota (JP); Yoshihiro Ikushima, Okazaki (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/978,714

(22) Filed: Dec. 22, 2015

(65) Prior Publication Data
US 2016/0186861 A1    Jun. 30, 2016

(30) Foreign Application Priority Data

Dec. 24, 2014  (JP) ................... 2014-261186

(51) Int. Cl.
*F16J 15/447* (2006.01)
*F16J 15/00* (2006.01)
(Continued)

(52) U.S. Cl.
CPC ........... *F16J 15/002* (2013.01); *F16J 15/3456* (2013.01); *F16J 15/447* (2013.01); *B60B 35/16* (2013.01); *B60B 2900/511* (2013.01)

(58) Field of Classification Search
CPC .... F16J 15/447; F16J 15/4472; F16J 15/4474; F16J 15/4476; F16J 15/4478; F01D 11/00; F01D 11/02; F01D 11/025; F01D 11/04; F01D 11/06
See application file for complete search history.

(56) References Cited

U.S. PATENT DOCUMENTS 6,485,022 B1 * 11/2002 Fedorovich .......... F16J 15/4474
                                                277/303
2003/0201609 A1 * 10/2003 Hood .................... F16C 33/765
                                                277/409
(Continued)

FOREIGN PATENT DOCUMENTS

JP  2007-040502    2/2007
JP     2009-2453    1/2009
(Continued)

OTHER PUBLICATIONS

Office Action issued Oct. 13, 2016 in Japanese Patent Application No. 2014-261186 (with partial English translation).

*Primary Examiner* — Gilbert Lee
(74) *Attorney, Agent, or Firm* — Oblon, McClelland, Maier & Neustadt, L.L.P.

(57) ABSTRACT

A rotary shaft and a seal mechanism are provided. The rotary shaft extends into outside air outside a case via a shaft hole provided in the case of a drive system. The seal mechanism prevents entry of foreign matter from the outside air into the shaft hole. The case includes a canopy portion and a recessed portion. The recessed portion is recessed coaxially with the canopy portion from an end face of the canopy portion in the direction of the axis. The seal mechanism includes a deflector and a seal member. The deflector is fixed to the rotary shaft in a liquid-tight manner, and extends into the recessed portion. The seal member is an elastic body. The seal member is fixed in the shaft hole in a liquid-tight manner, (Continued)

and is in sliding contact in a liquid-tight manner with the rotary shaft and the deflector.

12 Claims, 4 Drawing Sheets

(51) Int. Cl.
  *F16J 15/34* (2006.01)
  *B60B 35/16* (2006.01)

(56) References Cited

U.S. PATENT DOCUMENTS

| | | | | |
|---|---|---|---|---|
| 2007/0085276 | A1* | 4/2007 | Hartmann | F16J 15/3264 |
| | | | | 277/349 |
| 2007/0246893 | A1* | 10/2007 | Roddis | F16J 15/4478 |
| | | | | 277/408 |
| 2014/0159318 | A1* | 6/2014 | Lattime | F16J 15/3256 |
| | | | | 277/412 |
| 2015/0151573 | A1* | 6/2015 | Shibayama | F16J 15/3264 |
| | | | | 277/351 |
| 2016/0003302 | A1* | 1/2016 | Seno | F16J 15/3264 |
| | | | | 277/351 |

FOREIGN PATENT DOCUMENTS

| | | |
|---|---|---|
| JP | 2009-103142 | 5/2009 |
| JP | 2011-58524 | 3/2011 |
| JP | 2014-25566 | 2/2014 |
| JP | 2014-092227 | 5/2014 |

* cited by examiner

ROTARY SHAFT SEAL STRUCTURE FOR DRIVE SYSTEM OF VEHICLE

INCORPORATION BY REFERENCE

The disclosure of Japanese Patent Application No. 2014-261186 filed on Dec. 24, 2014 including the specification, drawings and abstract is incorporated herein by reference in its entirety.

BACKGROUND OF THE INVENTION

1. Field of the Invention

The invention relates to a rotary shaft seal structure for a drive system of a vehicle and, more particularly, to a rotary shaft seal structure for a drive system of a vehicle, which seals a clearance that is provided when a rotary shaft is rotatably inserted in a shaft hole of a case of the drive system.

2. Description of Related Art

When a rotary shaft is rotatably inserted in a shaft hole of a case, a seal member is installed to prevent leakage of lubricating oil, which is stored in the case and is required to lubricate or hydraulically operate a mechanism portion inside the case, to the outside via the shaft hole or prevent entry of foreign matter into the shaft hole.

As in the case of a drive system, such as a transmission and differential of a vehicle, when water is easily poured on a vicinity of the shaft hole from the outside, a deflector that diverts water for the purpose of protecting the seal member against water is mounted on the rotary shaft on the outer side in the axial direction with respect to the seal member. There is known a structure in which the deflector is covered with a canopy portion that extends outward in the axial direction from the case such that the deflector is less likely to be splashed with water from the radially outer side of the case (see, for example, Japanese Patent Application Publication No. 2011-58524 (JP 2011-58524 A)).

SUMMARY OF THE INVENTION

However, as described above, with the structure in which the deflector is covered with the canopy portion provided in the case, the shaft hole is formed such that the clearance between the canopy portion and the rotary shaft and the clearance between the canopy portion and the deflector are provided in a straight line toward the inner side in the axial direction, so there is a possibility that sealing performance decreases because of entry of water onto the seal member via the clearances.

The invention provides a rotary shaft seal structure for a drive system of a vehicle, in which water is less likely to reach a seal member across a deflector.

An aspect of the invention provides a rotary shaft seal structure for a drive system of a vehicle. The rotary shaft seal structure includes: a case having a shaft hole at an end of the case; a rotary shaft supported by the case, the rotary shaft extending into outside air outside the case via the shaft hole; and a seal mechanism interposed between the shaft hole and the rotary shaft. The case includes a canopy portion and a recessed portion. The canopy portion extends in an axial direction of the rotary shaft so as to surround the rotary shaft. The recessed portion is recessed coaxially with the canopy portion from an end face of the canopy portion in the axial direction. The seal mechanism includes a deflector and a seal member. The deflector includes an expanded portion and a penetration portion. The expanded portion is fixed to the rotary shaft in a liquid-tight manner and expands radially outward. The penetration portion bends from the expanded portion in the axial direction and extends into the recessed portion. The seal member is an elastic body, and includes a rotary shaft sliding contact portion and an extended portion. The rotary shaft sliding contact portion is fixed in the shaft hole in a liquid-tight manner on the case side with respect to the deflector between the case and the rotary shaft, and is in sliding contact in a liquid-tight manner with the rotary shaft. The extended portion extends in the axial direction and is in sliding contact in a liquid-tight manner with the expanded portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described in detail with reference to the accompanying drawings. Like reference numerals denote the same or corresponding members in the drawings referenced below.

Figure 1:
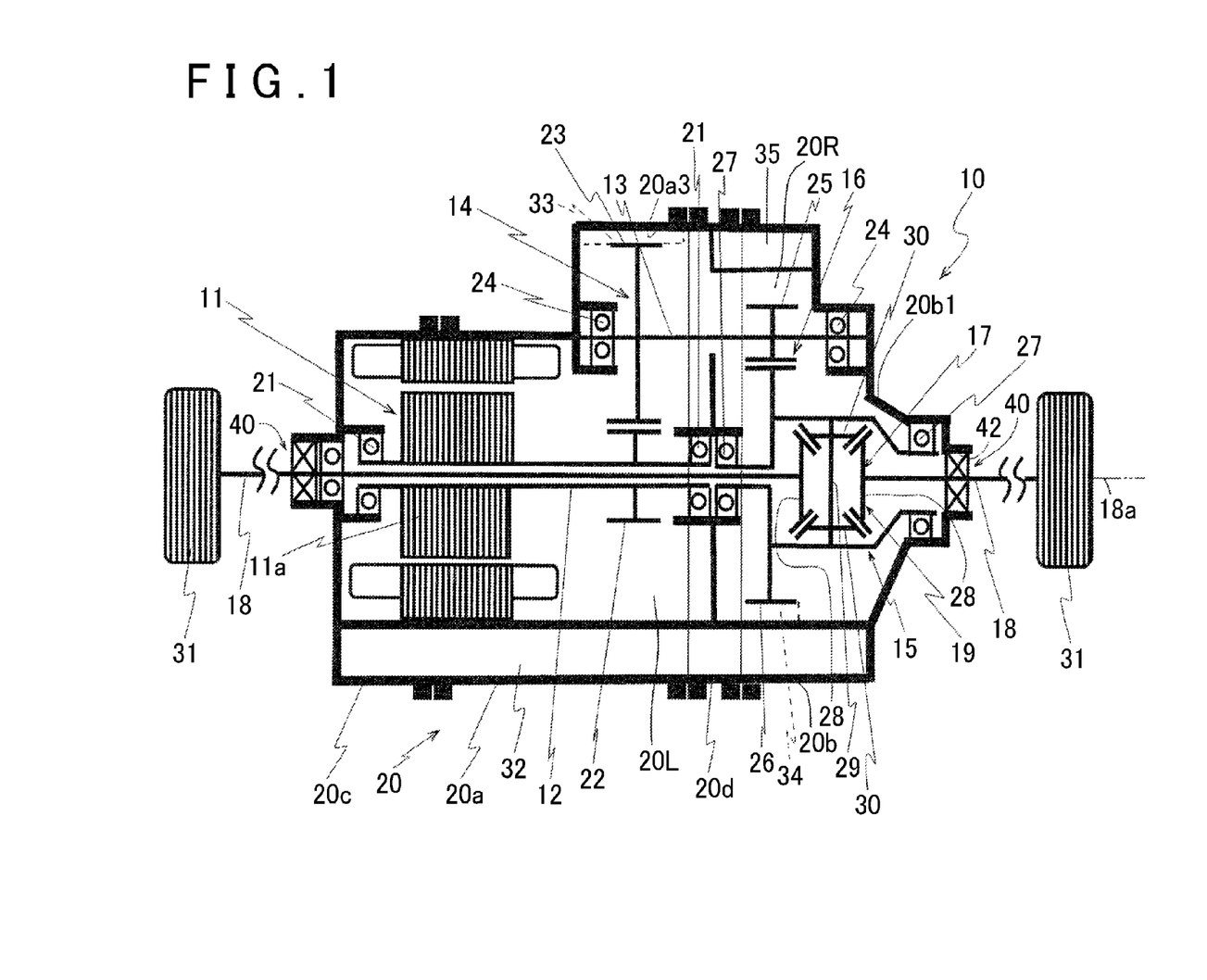
FIG. 1 is a skeletal view that illustrates the schematic configuration of a rear transaxle of a vehicle to which the invention is applied.

FIG. 1 is a skeletal view that shows the configuration of a rear transaxle 10, which is a drive system of a vehicle to which the rotary shaft seal structure for a drive system of a vehicle according to the invention is applied, in an electric four-wheel-drive vehicle. The rear transaxle 10 is a dual-axis electric drive system for a vehicle. The rear transaxle 10 includes an electric motor 11 as a drive source, a first reduction gear pair 14, a second reduction gear pair 16 and a differential gear unit 19 inside a transaxle case 20. The first reduction gear pair 14 is provided between an output shaft 12 of the electric motor 11 and a counter shaft 13 parallel to the output shaft 12. The second reduction gear pair 16 is provided between the counter shaft 13 and a differential case 15 parallel to the counter shaft 13 and concentric with the electric motor 11. The differential gear unit 19 includes a differential mechanism 17 provided inside the differential case 15. The differential gear unit 19 drives a pair of rear wheel-side drive axles 18 (each of which is an example of a rotary shaft) to rotate by the use of torque transmitted from the electric motor 11 via the first reduction gear pair 14 and the second reduction gear pair 16.

A rotor 11a of the electric motor 11 is coupled to the center portion of the output shaft 12. A pair of bearings 21 are fitted to both ends of the output shaft 12. Thus, the output shaft 12 is rotatably supported by the transaxle case 20 via the pair of bearings 21.

The first reduction gear pair 14 consists of a small-diameter counter drive gear 22 and a large-diameter counter driven gear 23. The counter drive gear 22 is integrally fixed to the distal end side of one end of the output shaft 12. The counter driven gear 23 is integrally fixed to one end side of the counter shaft 13 in a state where the counter driven gear 23 is in mesh with the counter drive gear 22. A pair of bearings 24 are respectively fitted to both ends of the counter shaft 13. The counter shaft 13 is rotatably supported by the transaxle case 20 via the pair of bearings 24.

The second reduction gear pair 16 is arranged so as to be displaced in the direction of the axis 18a of the drive axles 18 with respect to the first reduction gear pair 14. The second reduction gear pair 16 consists of a small-diameter final drive gear 25 and a large-diameter final driven gear 26. The final drive gear 25 is integrally fixed to the other end of the counter shaft 13. The final driven gear 26 is arranged so as to be displaced from the counter drive gear 22 in the direction of the axis 18a. The final driven gear 26 is fitted to the outer peripheral portion of the differential case 15 and integrally fixed in a state where the final driven gear 26 is in mesh with the final drive gear 25.

A pair of bearings 27 are respectively fitted to the outer peripheries of both axial ends of the differential case 15. Therefore, the differential case 15 and the final driven gear 26 integrally fixed to the differential case 15 are rotatably supported by the transaxle case 20 via these pair of bearings 27.

The differential mechanism 17 is of a generally known so-called bevel gear type. The differential mechanism 17 includes a pair of side gears 28 and a pair of pinion gears 30. The pair of side gears 28 are opposed to each other along the rotation axis inside the differential case 15. The pair of pinion gears 30 are rotatably supported by a pinion shaft 29 between these pair of side gears 28, and each are in mesh with the pair of side gears 28. The pinion shaft 29 is fixed to the differential case 15 in a state where the pinion shaft 29 is perpendicular to the rotation axis of the differential case 15.

The pair of drive axles 18 are respectively integrally coupled to the pair of side gears 28. The differential gear unit 19 that includes the differential case 15 and the differential mechanism 17 drives the pair of drive axles 18 to rotate by the use of torque transmitted from the electric motor 11 via the first reduction gear pair 14 and the second reduction gear pair 16 while allowing a rotation speed difference between the pair of drive axles 18. One of the pair of drive axles 18 is inserted through the hollow cylindrical output shaft 12 and is coupled to a vehicle left-side one of a pair of rear wheels 31.

Figure 2:
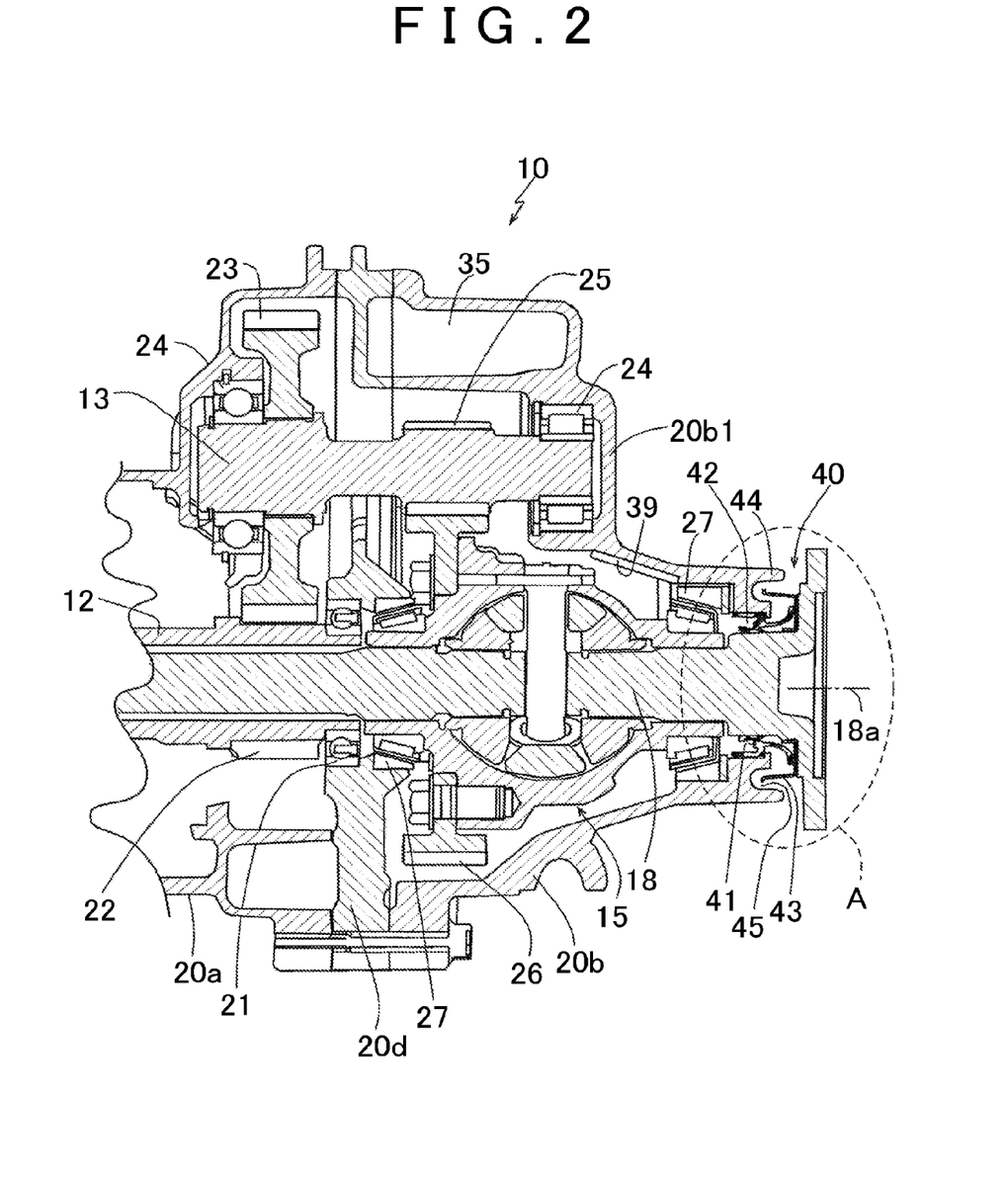
FIG. 2 is a partially enlarged longitudinal sectional view of the rear transaxle shown in FIG. 1.
Figure 3:
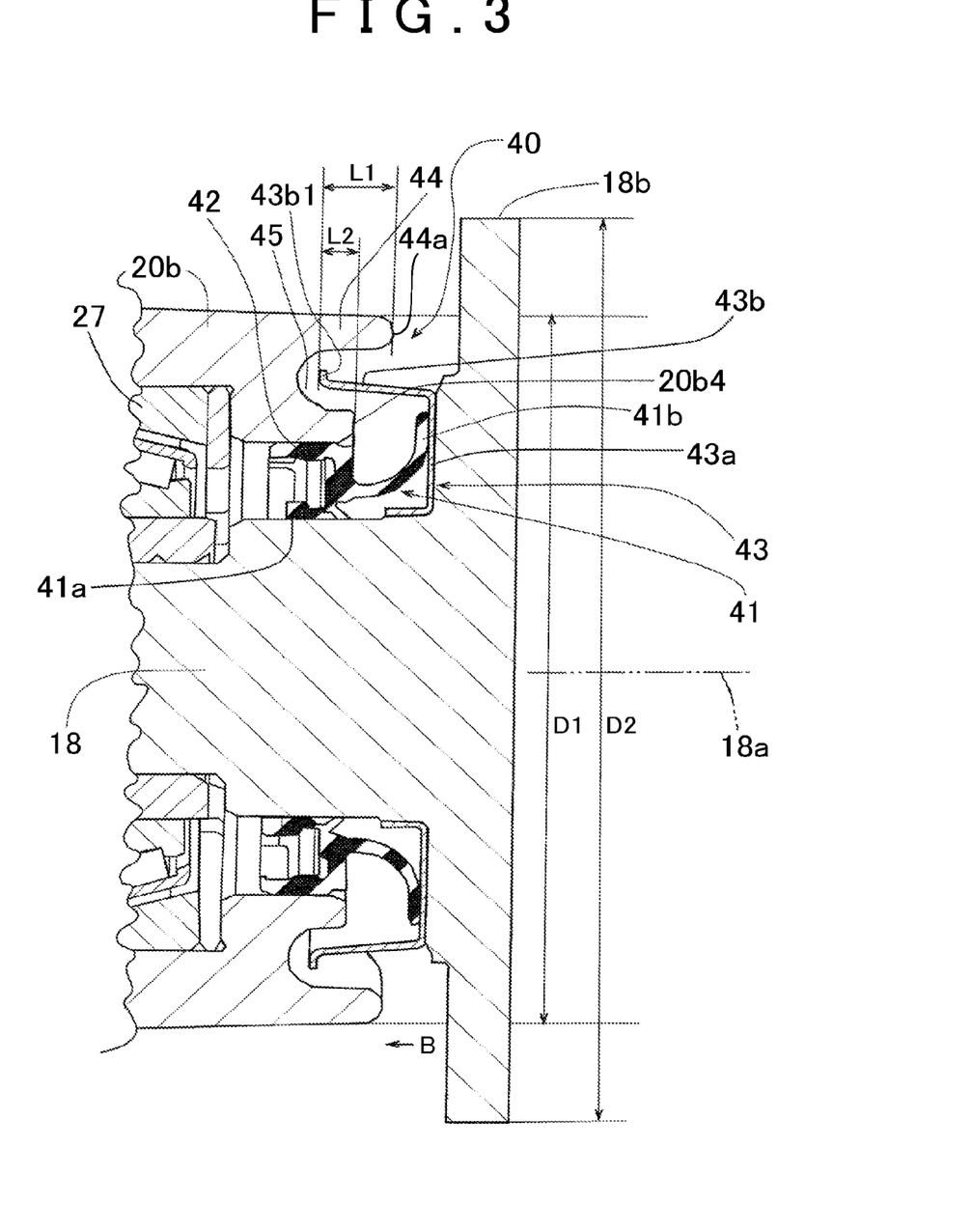
FIG. 3 is an enlarged view of portion A in FIG. 2.

As shown in FIG. 1, the transaxle case 20 is formed of four split portions in the direction of the axis 18a. A partition member 20d is a component of the transaxle case 20, and has a cylindrical shape. The partition member 20d partitions the inside of the transaxle case 20 into a first accommodation space 20L and a second accommodation space 20R. The first reduction gear pair 14 is accommodated in the first accommodation space 20L. The second reduction gear pair 16 is accommodated in the second accommodation space 20R. The transaxle case 20 further includes a cylindrical first split case portion 20a, a lid-shaped second split case portion 20b (which is an example of a case) and a lid-shaped third split case portion 20c. The first split case portion 20a is fixed to one side (left side in FIG. 1) of the partition member 20d. The first split case portion 20a defines the first accommodation space 20L. The second split case portion 20b is fixed to the other side (right side in FIG. 1) of the partition member 20d. The second split case portion 20b defines the second accommodation space 20R. The third split case portion 20c mainly accommodates the electric motor 11. The first split case portion 20a, the second split case portion 20b, the third split case portion 20c and the partition member 20d are components of the transaxle case 20, and are fastened to one another by bolts (not shown) in an oil-tight manner as shown in FIG. 1. These split case portions 20a, 20b, 20c and partition member 20d are made of a cast light alloy, for example, by aluminum die-casting, or the like. One of the above-described pair of bearings 21 and one of the above-described pair of bearings 27 are supported by the partition member 20d. As shown in FIG. 1 to FIG. 3, one of the drive axles 18 is supported by the second split case portion 20b, and extends into the atmosphere outside the second split case portion 20b from a corresponding shaft hole 42 provided at the end of the second split case portion 20b.

The counter driven gear 23 and the final driven gear 26 are configured to rotate to supply lubricating oil to lubricated portions by scooping up lubricating oil stored at the bottom in the transaxle case 20. That is, scoop-up lubrication is employed in the rear transaxle 10 according to the present embodiment. The scoop-up lubrication is to supply lubricating oil to the lubricated portions by scooping up lubricating oil that is stored at the bottom inside the transaxle case 20. The lubricated portions are, for example, meshing portions of the first reduction gear pair 14 and second reduction gear pair 16, gear meshing portions and rotational sliding portions of the differential mechanism 17, the bearings 21, 24, 27, and the like. As shown in FIG. 2, lubricating oil scooped up by the final driven gear 26 is guided to one of the pair of bearings 27, which is provided at a side wall 20b1 of the second split case portion 20b, via a rib 39 provided on the side wall 20b1. Thus, the bearing 27 is lubricated.

The transaxle case 20 includes a first catch tank 32 for storing part of scooped-up lubricating oil in order to lower the oil level position of lubricating oil that is stored at the bottom inside the transaxle case 20 for the purpose of reducing the stirring resistance of lubricating oil against the counter driven gear 23, which increases with an increase in vehicle speed V. A first oil passage 33 is provided inside the first split case portion 20a of the transaxle case 20. The first oil passage 33 guides lubricating oil, which is scooped up by the counter driven gear 23 of the first reduction gear pair 14, to the first catch tank 32. Lubricating oil stored in the first catch tank 32 is supplied from a lubricating oil supply port (not shown) provided in the first catch tank 32 to a lubricated portion, overflows from the first catch tank 32 as a result of accumulation of lubricating oil at or above a predetermined amount or is supplied as naturally drained oil from a drain port (not shown), provided at the bottom of the first catch tank 32, to lubrication required portions, such as bearings and oil seals that are not immersed in lubricating oil as a result of a decrease in the oil level position at the bottom in the transaxle case 20. Thus, lubricating oil is returned to the bottom inside the transaxle case 20.

On the other hand, a second oil passage 34 is provided inside the second split case portion 20b of the transaxle case 20. The second oil passage 34 guides lubricating oil, which is scooped up by the final driven gear 26 of the second reduction gear pair 16, to a second catch tank 35. The second catch tank 35, as well as the first catch tank 32, is provided in order to store scooped-up lubricating oil and lower the oil level position of lubricating oil that is stored at the bottom inside the transaxle case 20. Lubricating oil guided to the second catch tank 35 naturally drains from a drain hole (not shown), and is returned to the bottom inside the transaxle case 20.

Next, a rotary shaft seal structure that is applied to the pair of drive axles 18 of the rear transaxle 10 as the embodiment of the invention will be described with reference to the accompanying drawings.

As shown in FIG. 1, the rotary shaft seal structure includes seal mechanisms 40. Each of the seal mechanisms 40 is interposed between one of the pair of drive axles 18 and the corresponding shaft hole 42, and prevents entry of foreign matter from outside air into the corresponding shaft hole 42. For the sake of convenience of description, the seal mechanism 40 located at the right side in FIG. 1 will be described as a representative. As for the seal mechanism 40 located at the left side in FIG. 1, the configuration is similar to the right-side one except that the orientation of arrangement is inverted laterally, so the description thereof is omitted.

As shown in FIG. 1 and FIG. 2, the seal mechanism 40 includes a seal member 41. The seal member 41 seals a clearance that is provided when the drive axle 18 is rotatably inserted in the shaft hole 42 provided in the second split case portion 20b of the transaxle case 20. The seal member 41 has an oil seal function and a dust seal function. The oil seal function prevents leakage of lubricating oil, which is stored inside the transaxle case 20 and is required to lubricate or hydraulically operate a mechanism portion, such as the bearing 27, inside the transaxle case 20, to the outside via the shaft hole 42. The dust seal function prevents entry of foreign matter into the shaft hole 42.

As shown in FIG. 3, the seal member 41 is formed of an elastic body, such as rubber, and is supported by the second split case portion 20b. The seal member 41 includes an annular first seal lip portion 41a (which is an example of a rotary shaft sliding contact portion) and a second seal lip portion 41b (which is an example of an extended portion). The first seal lip portion 41a is fixed in a liquid-tight manner in the shaft hole 42 on the second split case portion 20b side with respect to a deflector 43 (described later) between the second split case portion 20b and the drive axle 18. The first seal lip portion 41a is in sliding contact in a liquid-tight manner with the drive axle 18. The second seal lip portion 41b extends in the direction of the axis 18a, and is in sliding contact in a liquid-tight manner with an expanded portion 43a of the deflector 43. The second seal lip portion 41b of the seal member 41 is in sliding contact in a liquid-tight manner with the expanded portion 43a in a state where the outer peripheral portion of the second seal lip portion 41b is expanded radially outward. The expanded portion 43a is fixed to the drive axle 18 in a liquid-tight manner, and expands radially outward. Thus, the contact area between the second seal lip portion 41b of the seal member 41 and the expanded portion 43a of the deflector 43 is sufficiently ensured, and it is possible to suppress variations in contact pressure, so it is possible to reliably block entry of foreign matter, such as water, into the shaft hole 42. The second seal lip portion 41b of the seal member 41 is in sliding contact in a liquid-tight manner with the expanded portion 43a in a state where the outer peripheral portion of the second seal lip portion 41b is expanded radially outward, and the expanded portion 43a is fixed to the drive axle 18 and expands radially outward. In comparison with the case where the second seal lip portion 41b is in sliding contact in a liquid-tight manner with the expanded portion 43a in a state where the outer peripheral portion of the second seal lip portion 41b is expanded radially inward and the expanded portion 43a is fixed to the drive axle 18 and expands radially outward, there is no gap between the second seal lip portion 41b and the expanded portion 43a around the portion at which the second seal lip portion 41b and the expanded portion 43a are in sliding contact with each other, so it is possible to prevent accumulation of water, or the like. Thus, it is possible to prevent degradation of sealing performance of the seal member 41.

Figure 4:
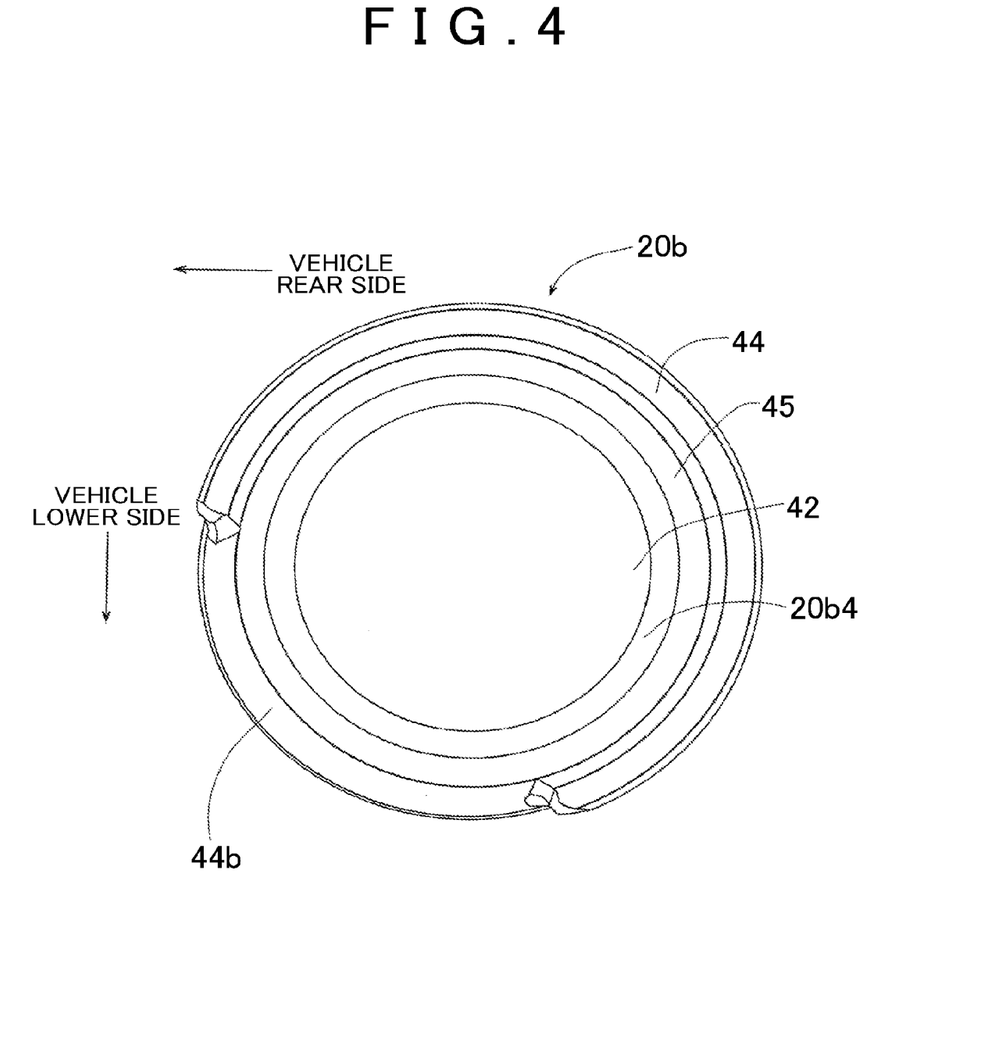
FIG. 4 is a view of a second split case portion when viewed in the B direction in FIG. 3.

As in the case of a drive system, such as the rear transaxle 10, when water is easily poured on a vicinity of the shaft hole 42 from the outside, the deflector 43 that diverts water for the purpose of protecting the seal member 41 against water is fixed to the drive axle 18 in a liquid-tight manner on the outer side in the direction of the axis 18a with respect to the seal member 41 as shown in FIG. 2 and FIG. 3. The second split case portion 20b includes a canopy portion 44. The canopy portion 44 extends from its end 20b4 in the direction of the axis 18a so as to surround the drive axle 18. Thus, the second split case portion 20b is configured such that water is less likely to be poured onto the deflector 43 from the radially outer side of the transaxle case 20. As shown in FIG. 2 to FIG. 4, a recessed portion 45 is recessed in the second split case portion 20b coaxially on the radially inner side with respect to the canopy portion 44 in the direction of the axis 18a from an end face 44a of the canopy portion 44. As shown in FIG. 3, the deflector 43 includes the expanded portion 43a and a penetration portion 43b. The expanded portion 43a is fixed to the drive axle 18 in a liquid-tight manner, and expands radially outward. The penetration portion 43b bends from the expanded portion 43a in the direction of the axis 18a, and extends into the recessed portion 45.

By providing the canopy portion 44 extending in the direction of the axis 18a so as to surround the drive axle 18, the recessed portion 45 recessed coaxially with the canopy portion from the end face 44a of the canopy portion 44 in the direction of the axis 18a, and the deflector 43 fixed to the drive axle 18 in a liquid-tight manner and extending into the recessed portion 45, as shown in FIG. 3, no clearance in a straight line is formed from the outer periphery of the canopy portion 44 toward the seal member 41 via the canopy portion 44, the recessed portion 45 and the deflector 43, but there is a labyrinth formed by the canopy portion 44, the recessed portion 45 and the deflector 43. Therefore, water is less likely to enter the seal member 41 across the deflector 43. Therefore, it is possible to prevent a decrease in the sealing function of the seal member 41. Triple foreign matter prevention measures, that is, the canopy portion 44 extending in the direction of the axis 18a from the end 20b4 of the second split case portion 20b so as to surround the drive axle 18, the second seal lip portion 41b that is in sliding contact in a liquid-tight manner with the expanded portion 43a of the deflector 43 and the first seal lip portion 41a that is in sliding contact in a liquid-tight manner with the drive axle 18, are provided. Therefore, it is possible to further prevent entry of foreign matter into the second split case portion 20b via the shaft hole 42. The canopy portion 44 or the recessed portion 45 may be provided by another member separate from the second split case portion 20b; however, when the canopy portion 44 or the recessed portion 45 is integrally formed with the second split case portion 20b, assembling of the canopy portion 44 or the recessed portion 45 is not required, so manufacturing is easy.

As shown in FIG. 3, a first lap distance L1 and a second lap distance L2 are set so as to be larger than the amount of movement S of the drive axle 18 in the direction of the axis 18a. The first lap distance L1 is a distance by which the end face 44a of the canopy portion 44 and a distal end 43b1 of the penetration portion 43b of the deflector 43 lap with each other. The second lap distance L2 is a distance by which the end 20b4 of the second split case portion 20b and the distal end 43b1 of the penetration portion 43b of the deflector 43 lap with each other. The amount of movement S of the drive axle 18 in the direction of the axis 18*a* is provided as a result of operation of the rear transaxle 10. Therefore, with this configuration, even when the rear transaxle 10 operates and the drive axle 18 is displaced by the amount of movement S in the direction of the axis 18*a*, no clearance in a straight line is formed from the outer periphery of the canopy portion 44 toward the seal member 41 via the canopy portion 44, the recessed portion 45 and the deflector 43, but the labyrinth is maintained by the canopy portion 44, the recessed portion 45 and the deflector 43, so water is less likely to enter the seal member 41 across the deflector 43. Therefore, it is possible to prevent a decrease in the sealing function of the seal member 41.

In a state where an interference of the second seal lip portion 41*b* of the seal member 41 with the expanded portion 43*a* of the deflector 43 is larger than the amount of movement S of the drive axle 18 in the direction of the axis 18*a*, the second seal lip portion 41*b* is in contact with the expanded portion 43*a* of the deflector 43. Thus, even when the rear transaxle 10 operates and the drive axle 18 is displaced by the amount of movement S in the direction of the axis 18*a*, the second seal lip portion 41*b* is able to maintain contact with the expanded portion 43*a* of the deflector 43, so the second seal lip portion 41*b* exhibits the dust sealing function. Therefore, it is possible to prevent a decrease in the sealing function of the seal member 41.

The canopy portion 44 has a cutout 44*b* at its vehicle rear lower-side portion, as shown in FIG. 4. Even when water enters the clearance between the canopy portion 44 and the penetration portion 43*b* of the deflector 43, the water flows downward along the penetration portion 43*b* of the deflector 43, drops from the clearance via the cutout 44*b* and is then drained to the outside of the second split case portion 20*b*. The vehicle rear lower-side portion of the canopy portion 44, at which the cutout 44*b* is provided, is located at a position on which water on a road surface, or the like, splashed by front wheels (not shown), or the like, is least likely to be poured within the canopy portion 44, so it is possible to ensure difficulty of entry of water into the deflector 43 because of the canopy portion 44.

As shown in FIG. 3, the drive axle 18 includes a flange portion 18*b* on the outer side in the direction of the axis 18*a* with respect to the end face 44*a* of the canopy portion 44. The outside diameter D2 of the flange portion 18*b* of the drive axle 18 is larger than the outside diameter D1 of the canopy portion 44, so it is possible to block water from the outer side of the drive axle 18 (right side in FIG. 3) toward the canopy portion 44 with the flange portion 18*b*.

As described above, the rotary shaft seal structure for a drive system of a vehicle according to the present embodiment includes the second split case portion 20*b* (which is an example of a case) of the rear transaxle 10 (which is an example of a drive system) of the vehicle, the drive axle 18 (which is an example of a rotary shaft) and the seal mechanism 40. The drive axle 18 is supported by the second split case portion 20*b*, and extends into outside air outside the second split case portion 20*b* via the shaft hole 42 provided at the end 20*b*4 of the second split case portion 20*b*. The seal mechanism 40 is interposed between the shaft hole 42 and the drive axle 18, and prevents entry of foreign matter from the outside air into the shaft hole 42. The second split case portion 20*b* includes the canopy portion 44 and the recessed portion 45. The canopy portion 44 extends in the direction of the axis 18*a* of the drive axle 18 so as to surround the drive axle 18. The recessed portion 45 is recessed coaxially with the canopy portion 44 from the end face 44*a* of the canopy portion 44 in the direction of the axis 18*a*. The seal mechanism 40 includes the deflector 43 and the seal member 41. The deflector 43 includes the expanded portion 43*a* and the penetration portion 43*b*. The expanded portion 43*a* is fixed to the drive axle 18 in a liquid-tight manner, and expands radially outward. The penetration portion 43*b* bends from the expanded portion 43*a* in the direction of the axis 18*a*, and extends into the recessed portion 45. The seal member 41 is an elastic body, and includes the first seal lip portion 41*a* (which is an example of a rotary shaft sliding contact portion) and the second seal lip portion 41*b* (which is an example of an extended portion). The first seal lip portion 41*a* is fixed in the shaft hole 42 in a liquid-tight manner on the second split case portion 20*b* side with respect to the deflector 43 between the second split case portion 20*b* and the drive axle 18, and is in sliding contact in a liquid-tight manner with the drive axle 18. The second seal lip portion 41*b* extends in the direction of the axis 18*a*, and is in sliding contact in a liquid-tight manner with the expanded portion 43*a*. Thus, by providing the canopy portion 44 extending in the direction of the axis 18*a* of the drive axle 18 so as to surround the drive axle 18, the recessed portion 45 recessed coaxially with the canopy portion 44 from the end face 44*a* of the canopy portion 44 in the direction of the axis 18*a*, and the deflector 43 fixed to the drive axle 18 in a liquid-tight manner and extending into the recessed portion 45, there is a labyrinth formed by the canopy portion 44, the recessed portion 45 and the deflector 43, so water is less likely to enter the seal member 41 across the deflector 43. Therefore, it is possible to improve the sealing function of the seal member 41.

As described above, with the rotary shaft seal structure for a drive system of a vehicle according to the present embodiment, the second seal lip portion 41*b* of the seal member 41 is in sliding contact in a liquid-tight manner with the expanded portion 43*a* of the deflector 43 in a state where the outer peripheral portion of the second seal lip portion 41*b* is expanded radially outward. Thus, the contact area between the second seal lip portion 41*b* of the seal member 41 and the expanded portion 43*a* of the deflector 43 is sufficiently ensured, and it is possible to suppress variations in contact pressure, so it is possible to reliably block entry of foreign matter, such as water, into the shaft hole 42. Because the second seal lip portion 41*b* of the seal member 41 is in sliding contact in a liquid-tight manner with the expanded portion 43*a* of the deflector 43 in a state where the outer peripheral portion of the second seal lip portion 41*b* is expanded radially outward, no gap is formed between the second seal lip portion 41*b* and the expanded portion 43*a* around the portion at which the second seal lip portion 41*b* of the seal member 41 and the expanded portion 43*a* are in sliding contact with each other, so it is possible to prevent accumulation of water, or the like.

As described above, with the rotary shaft seal structure for a drive system of a vehicle according to the present embodiment, the canopy portion 44 has the cutout 44*b* at its lower portion. Thus, even when water enters the clearance between the canopy portion 44 and the penetration portion 43*b* of the deflector 43, the water flows downward along the penetration portion 43*b* of the deflector 43, drops from the clearance via the cutout 44*b* and is then drained to the outside of the second split case portion 20*b*. The rotary shaft is the rear wheel-side drive axle 18, and the canopy portion 44 has the cutout 44*b* at its vehicle rear lower-side portion. The vehicle rear lower-side portion of the canopy portion 44, at which the cutout 44*b* is provided, is located at a position on which water on a road surface, or the like, splashed by the front wheels (not shown), or the like, is least likely to be poured within the canopy portion 44, so it is possible to ensure difficulty of entry of water into the deflector 43 because of the canopy portion 44.

As described above, with the rotary shaft seal structure for a drive system of a vehicle according to the present embodiment, the first lap distance L1 by which the end face 44a of the canopy portion 44 and the distal end 43b1 of the penetration portion 43b of the deflector 43 lap with each other and the second lap distance L2 by which the end face of the end 20b4 of the second split case portion 20b and the distal end 43b1 of the penetration portion 43b of the deflector 43 lap with each other are set so as to be larger than the amount of movement S of the drive axle 18 in the direction of the axis 18a. Thus, even when the drive axle 18 is displaced by the amount of movement S in the direction of the axis 18a, no clearance in a straight line is formed from the outer periphery of the canopy portion 44 toward the seal member 41 via the canopy portion 44, the recessed portion 45 and the deflector 43, but the labyrinth is maintained by the canopy portion 44, the recessed portion 45 and the deflector 43, so water is less likely to enter the seal member 41 across the deflector 43. Therefore, it is possible to prevent a decrease in the sealing function of the seal member 41.

In the present embodiment, the following configurations may be employed in order to obtain the above-described advantageous effects. That is, when the contact area between the second seal lip portion 41b of the seal member 41 and the expanded portion 43a of the deflector 43 is ensured, it is possible to suppress variations in contact pressure, so it is possible to reliably prevent entry of foreign matter, such as water, into the shaft hole 42. When the labyrinth is formed by the canopy portion 44, the recessed portion 45 and the deflector 43, water is less likely to enter the seal member 41 across the deflector 43, so it is possible to prevent a decrease in the sealing function of the seal member 41. The drive axle 18 includes the flange portion 18b on the outer side in the direction of the axis 18a with respect to the end face 44a of the canopy portion 44, and, when the outside diameter D2 of the flange portion 18b is larger than the outside diameter D1 of the canopy portion 44, it is possible to block water from the outer side of the drive axle 18 toward the canopy portion 44 with the flange portion 18b.

When there are a plurality of embodiments, unless otherwise specified, it is clear that characterized portions of the respective embodiments are allowed to be combined with each other as needed.

What is claimed is:

1. A rotary shaft seal structure for a drive system of a vehicle, the rotary shaft seal structure comprising:
   a case having a shaft hole at an end of the case;
   a rotary shaft supported by the case, the rotary shaft extending into outside air outside the case via the shaft hole; and
   a seal mechanism interposed between the shaft hole and the rotary shaft, wherein
   the case includes a canopy portion and a recessed portion, the canopy portion extends in an axial direction of the rotary shaft so as to surround the rotary shaft, and the recessed portion is recessed coaxially with the canopy portion from an end face of the canopy portion in the axial direction, and
   the seal mechanism includes a deflector and a seal member, the deflector includes an expanded portion and a penetration portion, the expanded portion is fixed to the rotary shaft in a liquid-tight manner and expands radially outward, the penetration portion bends from the expanded portion in the axial direction and extends into the recessed portion, the seal member is an elastic body, and includes a rotary shaft sliding contact portion and an extended portion, the rotary shaft sliding contact portion is fixed in the shaft hole in a liquid-tight manner on a case side with respect to the deflector between the case and the rotary shaft, and is in sliding contact in a liquid-tight manner with the rotary shaft, the extended portion extends in the axial direction and is in sliding contact in a liquid-tight manner with the expanded portion,
   wherein the canopy portion has a cutout at its lower portion, and
   wherein the rotary shaft is a rear wheel-side drive axle, and the canopy portion has the cutout at its vehicle rear-side portion.

2. The rotary shaft seal structure according to claim 1, wherein
   the extended portion is in sliding contact in a liquid-tight manner with the expanded portion in a state where an outer peripheral portion of the extended portion expands radially outward.

3. The rotary shaft seal structure according to claim 1, wherein
   a first lap distance by which an end face of the canopy portion and a distal end of the penetration portion lap with each other and a second lap distance by which an end face of the end of the case and the distal end of the penetration portion lap with each other are larger than the amount of movement of the rotary shaft in the axial direction.

4. The rotary shaft seal structure according to claim 1, wherein
   a contact area between the extended portion and the expanded portion is ensured.

5. The rotary shaft seal structure according to claim 1, wherein
   a labyrinth is formed by the canopy portion, the recessed portion and the deflector.

6. The rotary shaft seal structure according to claim 1, wherein
   the rotary shaft includes a flange portion on an outer side in the axial direction with respect to the end face of the canopy portion, and
   the outside diameter of the flange portion is larger than the outside diameter of the canopy portion.

7. A rotary shaft seal structure for a drive system of a vehicle, the rotary shaft seal structure comprising:
   a case having a shaft hole at an end of the case;
   a rotary shaft supported by the case, the rotary shaft extending into outside air outside the case via the shaft hole; and
   a seal mechanism interposed between the shaft hole and the rotary shaft, wherein
   the case includes a canopy portion and a recessed portion, the canopy portion extends in an axial direction of the rotary shaft so as to surround the rotary shaft, and the recessed portion is recessed coaxially with the canopy portion from an end face of the canopy portion in the axial direction, and
   the seal mechanism includes a deflector and a seal member, the deflector includes an expanded portion and a penetration portion, the expanded portion is fixed to the rotary shaft in a liquid-tight manner and expands radially outward, the penetration portion bends from the expanded portion in the axial direction and extends into the recessed portion, the seal member is an elastic body, and includes a rotary shaft sliding contact portion and an extended portion, the rotary shaft sliding contact portion is fixed in the shaft hole in a liquid-tight manner on a case side with respect to the deflector between the case and the rotary shaft, and is in sliding contact in a liquid-tight manner with the rotary shaft, the extended portion extends in the axial direction and is in sliding contact in a liquid-tight manner with the expanded portion, wherein the canopy portion is disposed radially outside the penetration portion of the deflector and covers a distal end of the penetration portion from an outside.

8. The rotary shaft seal structure according to claim 7, wherein the extended portion is in sliding contact in a liquid-tight manner with the expanded portion in a state where an outer peripheral portion of the extended portion expands radially outward.

9. The rotary shaft seal structure according to claim 7, wherein a first lap distance by which an end face of the canopy portion and the distal end of the penetration portion lap with each other and a second lap distance by which an end face of the end of the case and the distal end of the penetration portion lap with each other are larger than the amount of movement of the rotary shaft in the axial direction.

10. The rotary shaft seal structure according to claim 7, wherein a contact area between the extended portion and the expanded portion is ensured.

11. The rotary shaft seal structure according to claim 7, wherein a labyrinth is formed by the canopy portion, the recessed portion and the deflector.

12. The rotary shaft seal structure according to claim 7, wherein the rotary shaft includes a flange portion on an outer side in the axial direction with respect to the end face of the canopy portion, and the outside diameter of the flange portion is larger than the outside diameter of the canopy portion.

* * * * *